(12) United States Patent
Willetts

(10) Patent No.: US 11,067,211 B2
(45) Date of Patent: Jul. 20, 2021

(54) AIRCRAFT FLUID LINE COUPLING ASSEMBLY FOR RELEASABLY INTERCONNECTING FLUID CONVEYING MEMBERS

(71) Applicant: EATON INTELLIGENT POWER LIMITED, Dublin (IE)

(72) Inventor: Peter James Willetts, Birmingham (GB)

( * ) Notice: Subject to any disclaimer, the term of this patent is extended or adjusted under 35 U.S.C. 154(b) by 337 days.

(21) Appl. No.: 16/084,573

(22) PCT Filed: Mar. 17, 2017

(86) PCT No.: PCT/EP2017/000349
§ 371 (c)(1),
(2) Date: Sep. 13, 2018

(87) PCT Pub. No.: WO2017/157526
PCT Pub. Date: Sep. 21, 2017

(65) Prior Publication Data
US 2019/0072220 A1    Mar. 7, 2019

(30) Foreign Application Priority Data

Mar. 17, 2016    (GB) .................................... 1604507

(51) Int. Cl.
*F16L 37/50*    (2006.01)
*F16L 25/01*    (2006.01)
(Continued)

(52) U.S. Cl.
CPC ............. *F16L 37/505* (2013.01); *F16L 25/01* (2013.01); *F16L 37/113* (2013.01);
(Continued)

(58) Field of Classification Search
CPC ....... F16L 37/505; F16L 37/113; F16L 25/01; F16L 2201/10; F16L 21/06; F16L 17/04
(Continued)

(56) References Cited

U.S. PATENT DOCUMENTS 3,709,526 A *  1/1973  Cromie .................. F16L 23/04
4,008,937 A    2/1977  Filippi
(Continued)

FOREIGN PATENT DOCUMENTS

DE    10161144 A1    6/2003
DE    10161092 A1    7/2003
(Continued)

*Primary Examiner* — Zachary T Dragicevich
(74) *Attorney, Agent, or Firm* — Leydig, Voit & Mayer, Ltd.

(57) ABSTRACT

An aircraft fluid line coupling assembly includes: an inner tube; an outer tube assembly having an outer tube, the inner tube extending into the outer tube, and having first connector element of a twist-to-connect joint disposed on a front end of the outer tube; a retention member having second connector element of the twist-to-connect joint, the first and the second connector elements being detachably mated to releasably interconnect the retention member and the outer tube with each other, the retention member being arranged outwardly around a longitudinal portion the inner tube so as to prevent detachment of the inner tube from the outer tube when the twist-to-connect joint is in a connected position, and so as to allow detachment of the inner tube from the outer tube when the twist-to-connect joint is in an unconnected position; and a locking mechanism for locking the twist-to-connect joint.

18 Claims, 5 Drawing Sheets

(51) Int. Cl.
*F16L 37/113* (2006.01)
*B64D 37/00* (2006.01)
*B64D 37/04* (2006.01)

(52) U.S. Cl.
CPC ............ *B64D 37/005* (2013.01); *B64D 37/04* (2013.01); *F16L 2201/10* (2013.01)

(58) Field of Classification Search
USPC ........................................ 285/373
See application file for complete search history.

(56) References Cited

U.S. PATENT DOCUMENTS

| | | | |
|---|---|---|---|
| 4,249,786 | A | 2/1981 | Mahoff |
| 4,346,428 | A | 8/1982 | Gale |
| 4,465,330 | A | 8/1984 | De Cenzo |
| 4,900,070 | A | 2/1990 | Runkles et al. |
| 5,188,400 | A | 2/1993 | Riley et al. |
| 5,620,210 | A | 4/1997 | Eyster et al. |
| 5,786,976 | A | 7/1998 | Field |
| 6,880,859 | B2 | 4/2005 | Breay |
| 6,971,682 | B2 | 12/2005 | Hoang et al. |
| 7,144,047 | B2 | 12/2006 | Dole |
| 8,360,477 | B2 | 1/2013 | Flynn |
| 9,261,211 | B2 | 2/2016 | Schooley et al. |
| 2007/0158944 | A1* | 7/2007 | Mori ..................... F16L 37/113 |
| 2008/0258463 | A1 | 10/2008 | Horikawa et al. |
| 2011/0225789 | A1 | 9/2011 | Darnell |
| 2014/0246112 | A1 | 9/2014 | Flynn et al. |
| 2015/0101176 | A1 | 4/2015 | Spreine et al. |
| 2016/0146386 | A1* | 5/2016 | Blake |

FOREIGN PATENT DOCUMENTS

| | | |
|---|---|---|
| DE | 202009001431 U1 | 4/2009 |
| EP | 2304297 A1 | 4/2011 |
| EP | 2513545 A1 | 10/2012 |
| EP | 2672156 A1 | 12/2013 |
| EP | 2889524 A2 | 7/2015 |
| ES | 2412606 A1 | 7/2013 |
| GB | 1318836 A | 5/1973 |
| GB | 1509578 A | 5/1978 |
| WO | WO 2010001214 A1 | 1/2010 |
| WO | WO 2011073783 A1 | 6/2011 |
| WO | WO 2012088055 A1 | 6/2012 |
| WO | WO 2014143501 A1 | 9/2014 |
| WO | WO 2015159228 A1 | 10/2015 |

* cited by examiner

AIRCRAFT FLUID LINE COUPLING ASSEMBLY FOR RELEASABLY INTERCONNECTING FLUID CONVEYING MEMBERS

CROSS-REFERENCE TO PRIOR APPLICATIONS

This application is a U.S. National Phase application under 35 U.S.C. § 371 of International Application No. PCT/EP2017/000349, filed on Mar. 17, 2017, and claims benefit to Great Britain Patent Application No. GB 1604507.2, filed on Mar. 17, 2016. The International Application was published in English on Sep. 21, 2017 as WO 2017/157526 under PCT Article 21(2).

FIELD

The present disclosure relates generally to aircraft fluid line coupling assemblies, more particularly to an aircraft fluid line coupling assembly comprising an inner and an outer tube being releasably interconnected together by means of a retention member.

BACKGROUND

WO 2012/088055 A1 discloses a coupling assembly interconnecting a flexible inner tube with a rigid outer tube assembly. The outer tube assembly includes a retainer flange having a retainer slot formed therein for containment of the retainer clip. The retainer clip is mounted to the outer tube and extends inwardly to interfere with a retainer collar being slipped onto the inner tube. The retainer clip prevents the release of the inner tube from the outer tube assembly while permitting some axial movement.

WO 2015/159228 A1 discloses a bulkhead connector assembly comprising a housing and a collar, which are configured to connect corresponding fluid handling components to one another. The collar may be rotatable to a latched position to hold the component within the housing and fluidly communicate the corresponding fluid handling components with one another.

SUMMARY

In an embodiment, the present invention provides an aircraft fluid line coupling assembly, comprising: an inner tube; an outer tube assembly having an outer tube, the inner tube extending into the outer tube, and having first connector element of a twist-to-connect joint disposed on a front end of the outer tube; a retention member having second connector element of the twist-to-connect joint, the first and the second connector elements being detachably mated to releasably interconnect the retention member and the outer tube with each other, the retention member being arranged outwardly around a longitudinal portion the inner tube so as to prevent detachment of the inner tube from the outer tube when the twist-to-connect joint is in a connected position, and so as to allow detachment of the inner tube from the outer tube when the twist-to-connect joint is in an unconnected position; and a locking mechanism configured to lock the twist-to-connect joint when it is in the connected position, wherein the retention member comprises first and second clam shell halves, the clam shell halves being pivotally connected with each other about a pivot axis that is arranged parallel to a longitudinal axis of the inner tube.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
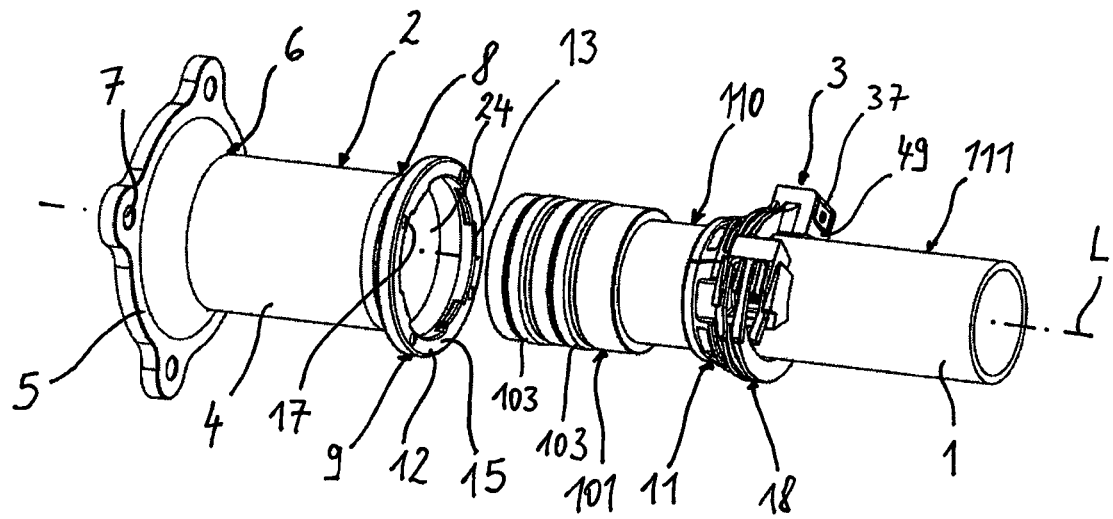
FIG. 1 is an aircraft fluid line coupling assembly in a perspective partially exploded view.

In an embodiment, the present invention provides an enhanced aircraft fuel line coupling assembly allowing the complete detachment of a first fluid conveying member from a second fluid conveying member in maintenance friendly manner.

The aircraft fluid line coupling assembly according to the invention comprising an inner tube, an outer tube assembly having an outer tube, wherein the inner tube extends into the outer tube, and having a first connector element of a twist-to-connect joint disposed on a front end of said outer tube, a retention member having a second connector element of the twist-to-connect joint, wherein the first and the second connector element being detachably mated to releasably interconnect the retention member and the outer tube with each other, wherein the retention member is arranged outwardly around a longitudinal portion of the inner tube preventing the detachment of the inner tube from the outer tube when the twist-to-connect joint is in a connected position and allowing the detachment of the inner tube from the outer tube when the twist-to-connect joint is in an unconnected position, and a locking mechanism being adapted to lock the twist-to-connect joint when it is in said connected position.

By this means, the inner tube is fluidly interconnected with the outer tube assembly when the twist-to-connect joint is in said connected position. The inner tube is enclosed by the retention member, wherein the retention member is releasably coupled with the outer tube assembly by means of the twist-to-connect joint. When the retention member and the outer tube assembly are connected with each other, the locking mechanism lock the twist-to-connect joint against uncommanded or commanded disconnection. With other words, the locking mechanism hinders mutual rotational movement of the retention member and the outer tube assembly in a locked connected position thus preventing uncommanded or commanded disconnection of the releasably interconnected inner and outer tubes. Moreover, the retention member comprising a first and a second clam shell halve. The clam shell halves are pivotally connected with each other about a pivot axis that is arranged parallel to a longitudinal axis of the inner tube.

Thereby, the retention member may be opened by pivoting the two clam shell halves about the pivot axis. This enables detachment of the retention member from the inner tube. After that, the released inner tube may be completely detached from the outer tube assembly. Thus, the retention member can be easily detached from the outer tube and the inner tube without moving any further components of the aircraft fluid line coupling assembly, besides the retention member itself. In sum, the inner tube can be detached from the outer tube assembly allowing the complete removal of the inner tube from the aircraft fluid line coupling assembly. For detachment of the inner tube from the outer tube, firstly, the locking mechanism has to be actuated to unlock the twist-to-connect joint. Then, rotary movement of the first and/or the second connector elements are/is enabled. After having rotated, preferably about 20 to 40 degree, particularly 30 degree, the retention member may be pulled away from the outer tube assembly in axial direction and/or the two clam shell halves are opened by pivoting them about the pivot axis allowing the complete detachment of the inner tube from the outer tube assembly. The retention member is a separate component being structurally separated from the inner tube and/or the outer tube.

In principle, the retention member may be of a closed annular shape being slidably attached around the inner tube. When the twist-to-connect joint is in an unlocked position, that is when the locking mechanism releases the twist-to-connect joint, the retention member may be slidingly pulled over the inner tube away from the outer tube assembly. Then, the retention member and the inner tube may be detached from the outer tube assembly.

The retention member, further, may comprise a retaining device being utilised to retain the two clam shell halves around the inner tube. The retaining device may comprise grooves being arranged at one of the clam shell halves and/or resilient elements at the other one of the clam shell halves. Said resilient elements may engage into said grooves. Thus, the resilient elements and the grooves may interact such as a releasable clip connection. Thereby, the retention member can be easily detached from the inner tube and attached around the inner tube, respectively. The resilient members may be fingers engaging the grooves in a closed position of the retention member.

The first connector element may form a female connector of the twist-to-connect joint and the second connector may form a mating male connector of the twist-to-connect joint. In order to facilitate assembling of the coupling assembly, the first connector element may comprise a mounting ring disposed on the front end of the outer tube facing towards the inner tube. Further, the second connector element may comprise an annular collar disposed on the retention member. The collar may extend, especially axially extend into the outer tube assembly through a central bore of the mounting ring. Thus, a safe and easy to install coupling assembly is provided. The twist-to-connect joint could also referred to as bayonet closure. In this respect, the first connector could be referred to as bayonet connector or bayonet socket receiving the mating second connector. Analogously, the second connector element of the twist-to-connect joint could form the female connector and the first connector element of the twist-to-connect joint could form the mating male connector.

Preferably, the mounting ring of the first connector element having at least one recess and the second connector element may have at least one protrusion interfering the recess to connect the twist-to-connect joint. Particularly, at least one of the recesses may be L-shaped. Further, at least one of the protrusions may extend radially outward interfering one of the L-shaped recesses of the mounting ring. To facilitate the assembling of the twist-to-connect joint, the mounting ring may have two, three, four, five or six, preferably four L-shaped recesses distributed over the circumference of the mounting ring. Each of the L-shaped recesses comprising an insertion area and a catch area. Preferably, the insertion area extends axially and the catch area extends radially. Thereby, the twist-to-connect joint may be connected by inserting the protrusions into the insertion areas by pushing the retention member towards the outer tube, and, then, rotating the retention member thereby moving the protrusions into the catch areas. In this position, the twist-to-connect joint is in said connected position. The first and/or the second connector elements, further, may comprise at least one stop element to specify a direction of twist for connecting the twist-to-connect joint. Thus, the twist-to-connect joint may only be transferred into said connected position by a clockwise or counter clockwise rotary movement.

The locking mechanism may, further, comprise an axially moveable locking element being disposed at the retention member, and the locking mechanism may, further, comprise at least one bore being disposed in the outer tube assembly and arranged to receive the locking element. Thus, the locking mechanism is utilised to lock and unlock the twist-to-connect joint assuming the twist-to-connect joint is in said connected position. The at least one bore is disposed within the mounting ring, particularly on a front face of the mounting ring facing towards the retention member. As long as the locking element extends into the bore, rotary movement of the first and second connector elements of the twist-to-connect joint against each other is prevented. Whereas the rotary movement of the twist-to-connect joint is permitted, that is released for disconnection when the locking element is lifted out of the corresponding bore.

The locking mechanism may be utilised to lock automatically. Preferably, the locking mechanism is transferred in an unlocked position by manual operation. The locking element could be biased in a direction towards the outer tube assembly. Further, the locking element may be formed as a locking pin extending through a helix compression spring. The spring may be held in preloaded manner between a wall element of the retention member and the locking pin, particularly an annular projection of the locking pin. By this means, the twist-to-connect joint automatically locks the twist-to-connect joint as soon as the biased locking element overlaps the bore. Moreover, the operator of the coupling assembly, for instance an aircraft mechanic, perceives an audible signal such as a clicking sound caused by the shoot out of the locking element into the bore and/or hit of the locking element against a facing part of the outer tube assembly. Thus, the operator recognizes that the second connector member or the first connector member has been sufficiently rotated, and, further, that the twist-to-connect joint is now safely connected. To unlock or release the twist-to-connect joint that is in said connected position, preferably, the operator manually lifts the locking element against the biasing force out of the bore.

The locking mechanism further may comprise a lock indicator element being disposed at a distal end of the locking element facing away from the outer tube assembly. The indicator allows visual perception of the position of the locking mechanism, which either can be in a locked or unlocked position. Preferably, the distal end of the locking element extends through an aperture of the retention member, wherein the lock indicator element may be captively disposed at the locking element outside the retention member.

To facilitate manual operation of the locking mechanism, particularly, to facilitate manual unlocking of the locked twist-to-connect joint, the lock indicator element may be formed as a handle for lifting the locking element out of the bore.

Preferably, the inner tube is radially supported by the retention member and/or is retained axially slidable by the retention member. In said connected position, the inner tube is retained within the outer tube assembly. The aircraft fluid coupling assembly permits some axial movement of the inner tube within the retention member. However, the inner tube is retained within the outer tube assembly, assuming the twist-to-connect joint is in said connected position. The retention member having an inner surface contacting the outer surface of the longitudinal portion of the inner tube.

According to an embodiment, the aircraft fluid line coupling assembly, further, comprising a tube collar attached to an end of the inner tube. The outer tube may cover the outside diameter of the tube collar. Further, the outside diameter of the tube collar may be larger than the inner diameter of the retention member. Thus, the inner tube may be retained within the outer tube. When an axial force is applied on the inner tube trying to pull the inner tube out of the outer tube assembly, assuming the twist-to-connect joint is in said connected position, the tube collar hits against the retention member retaining the inner tube within the outer tube assembly.

The tube collar may have at least one circumferential groove formed therein, wherein a seal is disposed in the groove in tube collar. An inner surface of the outer tube may contact said seal. Thus, the aircraft fluid line coupling is sealed.

A mounting flange may be disposed at an opposite front end of the outer tube for attachment of the aircraft fluid line coupling assembly to some part of an aircraft structure or to another component of a fluid line system. The outer tube assembly may be formed as a bulkhead fitting. The bulkhead fitting may be utilised to secure the inner tube to a bulkhead of an aircraft structure, such as a bulkhead, also called rib, of an internal wing tank. The outer tube may be made of an electrically conductive polymeric material or of a metallic material, more specifically a light metal. Thus, the outer tube may be a rigid or flexible tube of a fluid line assembly of an aircraft. Further, the inner tube may be made of an electrically conductive polymeric material or of a metallic material, more specifically a light metal. Thus, the inner tube may be a rigid or flexible tube of a fluid line assembly of an aircraft. The fluid line assembly may be a fuel line assembly of the aircraft.

FIG. 1 shows an aircraft fluid line coupling assembly, in a partially exploded perspective view. Said coupling assembly may serve to secure an aircraft fuel line to a bulkhead, also called rib, of an aircraft wing. The coupling assembly comprises a first fluid conveying member or inner tube assembly 111, a second fluid conveying member or outer tube assembly 2, that may also be referred to as bulkhead fitting 2, and a retention member 3 for releasably interconnecting the inner tube 1 with the bulkhead fitting 2.

Figure 2:
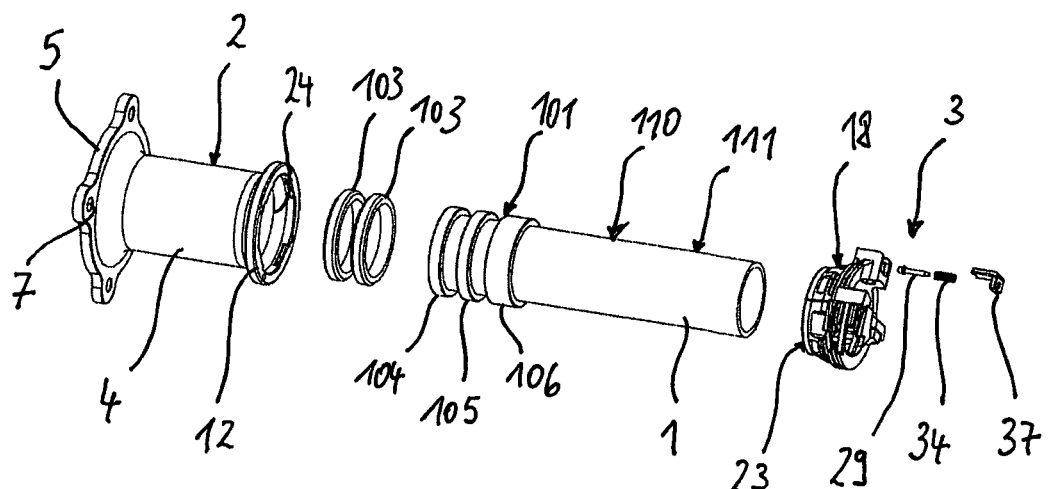
FIG. 2 is the coupling assembly according to FIG. 1 in a perspective exploded view.

Now referring to FIG. 2, the inner tube assembly 111 comprises an inner tube 1 having a tubular shape and may be made of metal tubing or flexible hose. Here, the inner tube 1 is made up of a length of polymeric tubing that is quite flexible but it has sufficient stiffness to maintain its form. The polymeric inner tube 1 may be electrically conductive which meets the electrical dissipation requirements for use in aircraft fuel systems.

A tube collar 101 is attached to an end of the inner tube 1. The tube collar 101 has two circumferential grooves 102 formed therein. The grooves 102 are designed to hold respective electrically conductive O-ring seals 103 providing a fluid seal. The tube collar 101 is divided into a plurality of sections between the seal grooves 102. The sections are identified as inner land bearing 104, middle land bearing 105 and outer land bearing 106. These land bearings 104, 105, 106 are sized to loosely fit inside of an outer tube 4 sufficient to permit the inner tube 1 to be operational while at a longitudinal angle relative to the bulkhead fitting 2. At the larger relative angles, the middle land bearing 105 will not be in contact with the inner surface of the outer tube 4 of the bulkhead fitting 2 but the inner and outer land bearings 104, 106 will be in contact with the inner surface of the outer tube 4. FIGS. 1 and 2 shows only a partial length of the inner tube 1 and normally there will be a tube collar 101 at each end of the inner tube 1.

Each of the O-rings 103 are typically made of a nitrile, fluorosilicone or fluorocarbon base material and are each filled with some type of electrically conductive material such as carbon powder or carbon Nano tubes. These electrically conductive O-ring seals 103 provide for the conduction of electricity such as static electricity from the inner tube 1 to the outer tube assembly 2 and vice versa. This is a mandatory function to minimize the chance of the ignition of fuel vapours by the electricity introduced into the airframe by a lightning strike. These O-rings 103 are electrically conductive and electrically connect the outer assembly 2 and the inner tube 1 to one another in addition to providing a fluid seal.

The bulkhead fitting 2 comprises the outer tube 4 that may be made of metal. To secure the bulkhead fitting 2 to the bulkhead of an aircraft, a mounting flange 5 is disposed on a first front end 6 of the outer tube element 4 facing away from the inner tube 1. The mounting flange 5 comprises four holes 7 allowing locknuts to be installed, securing the bulkhead fitting 2 to the bulkhead.

Figure 3:
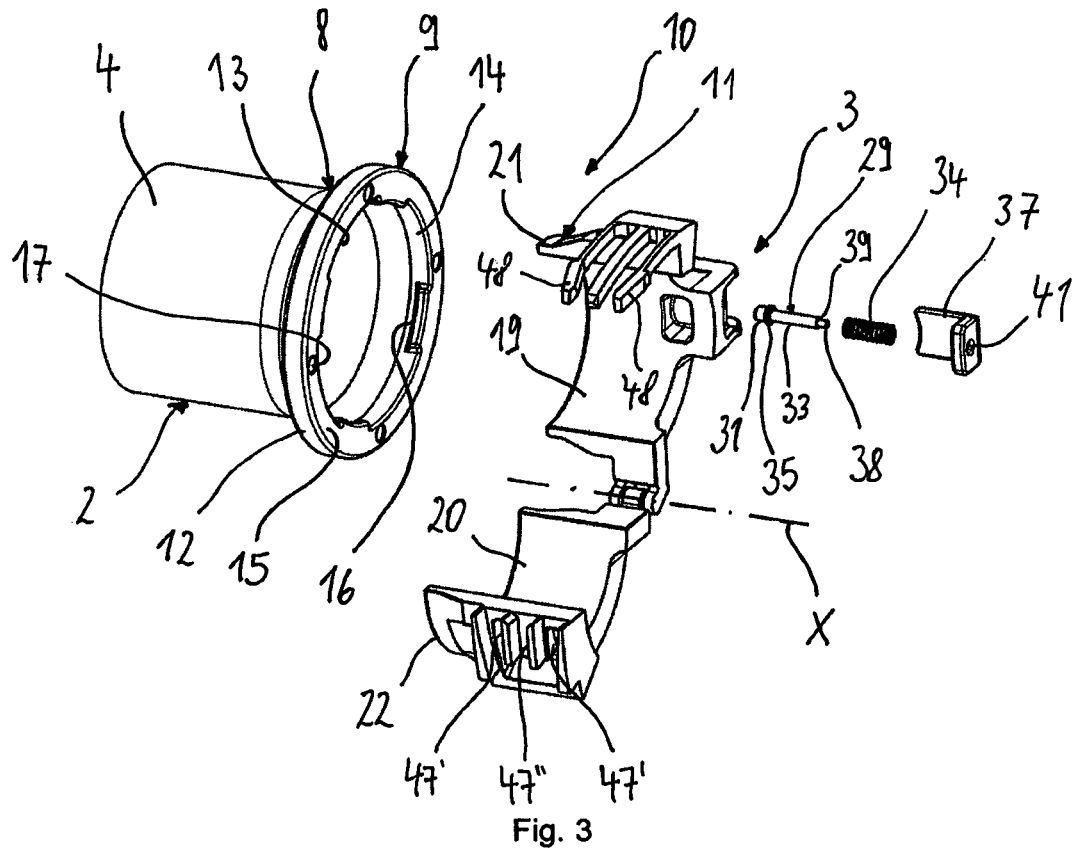
FIG. 3 is a retention member of the coupling assembly according to FIG. 1 in a perspective exploded view, wherein the retention member is shown in open position.

Now referring to FIG. 3, a partial view of the coupling assembly is shown, whereby in contrast to FIGS. 1 and 2, the inner tube assembly 111 is not shown and the bulkhead fitting 2 is partially sectioned to better illustrate and explain the present disclosure. On the second front end 8 of the bulkhead fitting 2 facing towards the inner tube 1, first connector element 9 of a twist-to-connect joint 10 is disposed. The first connector element 9 forms a female connector of the twist-to-connect joint 10 interacting with mating second connector element 11. The second connector element 11 forms a male connector of the twist-to-connect joint 10 being disposed at the retention member 3. Thereby, the retention member 3 and the bulkhead fitting 2 are releasably coupled by means of the twist-to-connect joint 10, also called bayonet joint.

In detail, the first connector element 9 comprises a mounting ring 12 being arranged flangelike at the second front end 8 of the outer tube 4 facing towards the inner tube 1. The mounting ring 12 has four L-shaped recesses 13 being distributed over the circumference of the mounting ring 12. The L-shaped recesses 13 each comprise an axially oriented insertion area 14 reaching up to a front face 15 of the mounting ring 12 and a radially oriented catch area 16 being disposed further inward and spaced apart from the front face 15 of the mounting ring 12. The mounting ring 12, further, comprises four axially extending bores 17 being distributed circumferentially over the mounting ring 12.

Figure 4:
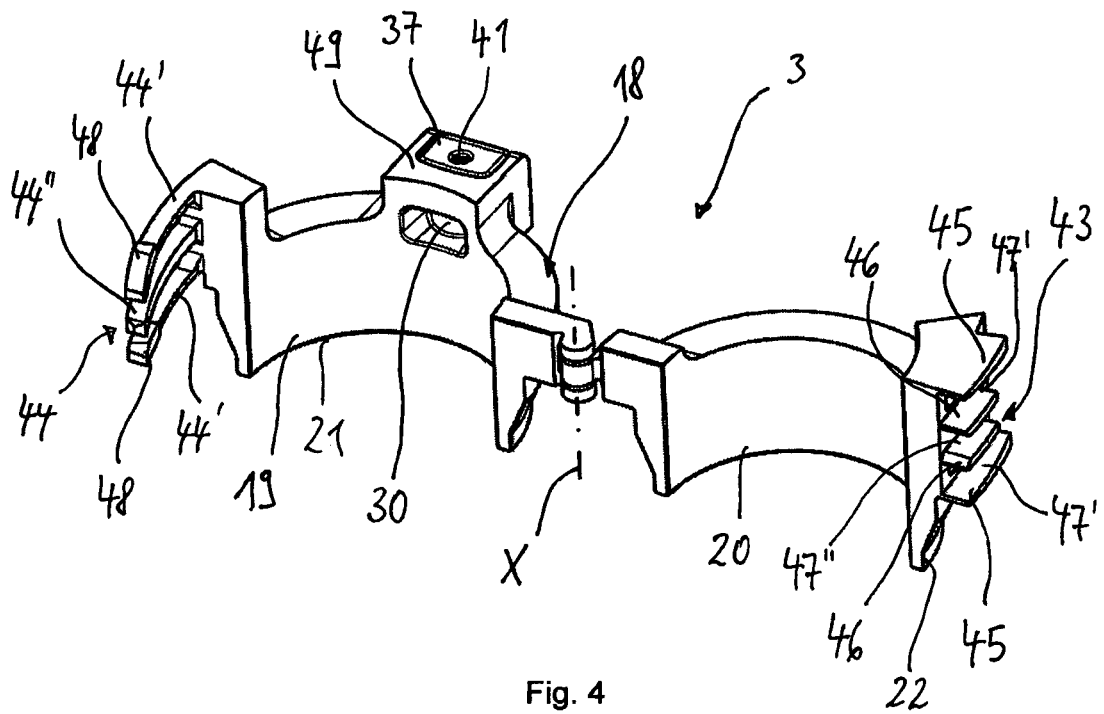
FIG. 4 is the retention member of FIG. 3 in a perspective view, wherein the retention member is shown in open position.
Figure 5:
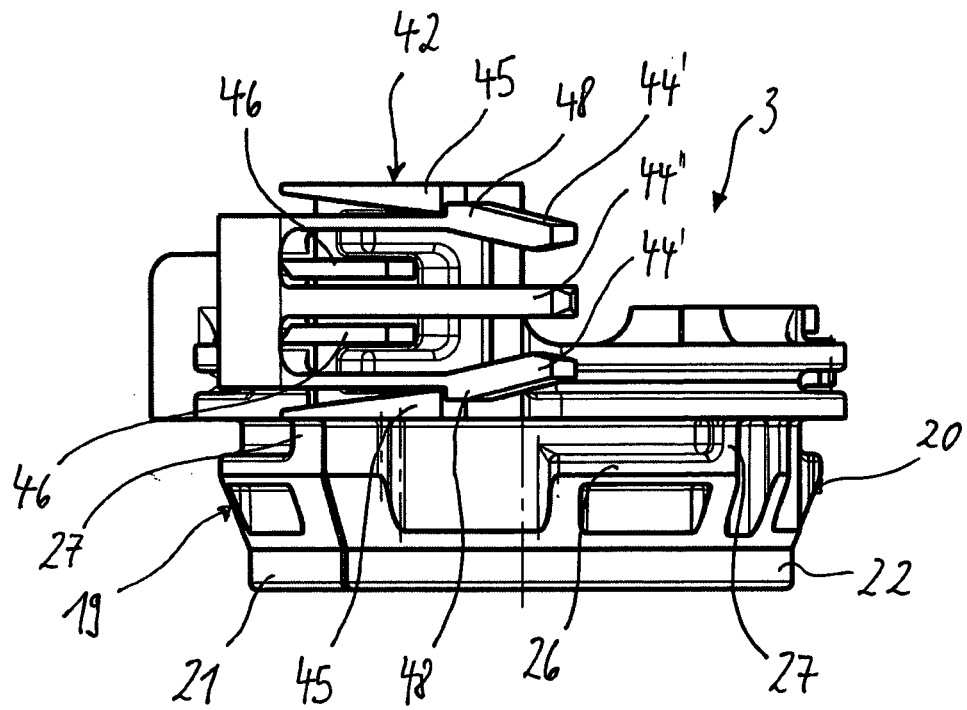
FIG. 5 is the retention member of FIG. 3 in a perspective view, wherein the retention member is shown in closed position.

Now referring to FIGS. 3-5, wherein the retention member 3 in FIGS. 3 and 4 is shown in open position, whereas the retention member 3 in FIG. 5 is shown in closed position. As can be seen, the retention member 3 is a component that is structurally separated from the inner tube assembly 111 and the outer tube assembly 2. The retention member 3 comprises a clam shell 18 detachably attached around a longitudinal portion 110 of the inner tube 1. An inner surface of the retention member 3 contacts the outer surface of the longitudinal portion 110 of the inner tube 1.

Figure 7:
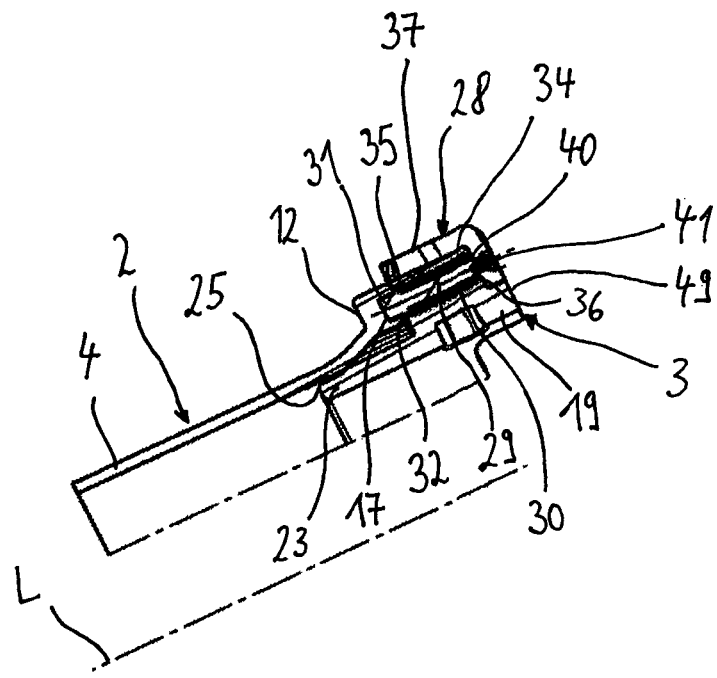
FIG. 7 is a partial view of the coupling assembly according to FIG. 1 in a sectional view along lines VII-VII shown in FIG. 6.
Figure 8:
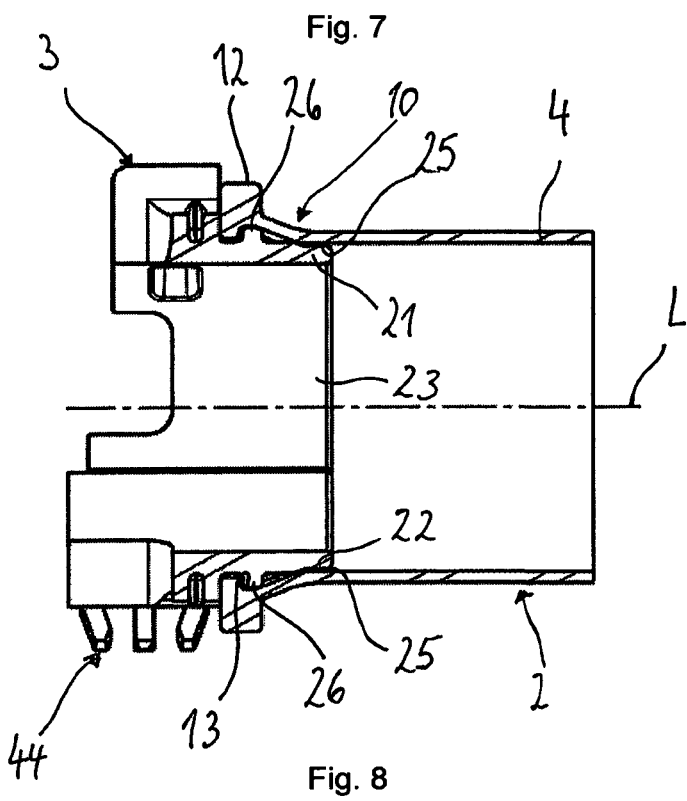
FIG. 8 is a partial view of the assembly according to FIG. 1 in a sectional view along lines VIII-VIII shown in FIG. 6.

The clam shell 18 comprising a first and a second clam shell halve 19, 20 being pivotable connected with each other about a pivot axis X that is arranged parallel to a longitudinal axis L of the inner tube 1. The second connector element 11 of the twist-to-connect joint 10 comprises two collar halves 21, 22 each being formed at one of the clam shell halves 19, 20. Both collar halves 21, 22 form a continuous collar 23 extending through a central bore 24 of the mounting ring 12 into the bulkhead fitting 2, assuming the clam shell 18 is attached around the longitudinal portion 110 of the inner tube 1. The annular collar 23 is in contact with an inner wall section 25 of the outer tube element 4 of the bulkhead fitting 2, as can be seen in FIGS. 7 and 8. The second connector element 11, further, comprises four radially outward extending protrusions 26 interfering the L-shaped recesses 13 of the mounting 12. To ensure that the twist-to-connect joint 10 may only be connected by a clockwise rotation of the retention member 3, axially arranged stop elements 27 are formed at the collar halves 21, 22.

Figure 9:
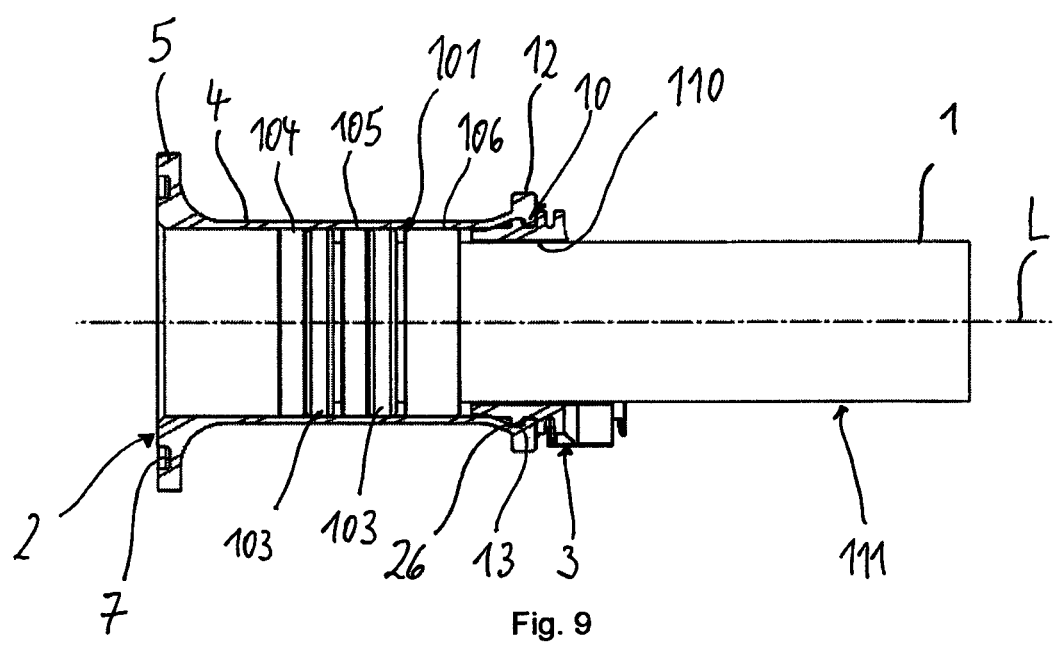
FIG. 9 is the coupling assembly according to FIG. 1 in a sectional view in a connected position.

The retention member 3, further, comprises a locking mechanism 28 being adapted to lock the twist-to-connect joint 10 in a connected position, as shown in FIG. 9. The locking mechanism 28 comprises a locking element 29 being axially moveable supported within a chamber 30 of the first clam shell halve 19. The locking element 29 is formed as a locking pin.

Figure 6:
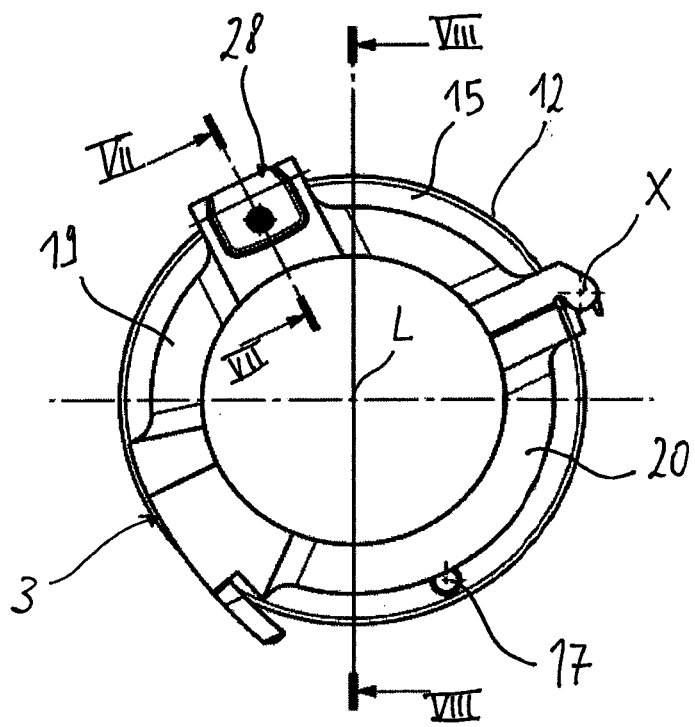
FIG. 6 is a partial view of the coupling assembly according to FIG. 1 in a side view.

To describe the locking mechanism 28 in more detail, it is now referred to FIGS. 2-3 and FIG. 7, wherein FIG. 7 shows a partial sectional view along lines VII-VII shown in FIG. 6. A lower distal end 31 of the locking pin 29 extends through a lower aperture 32 of the first clam shell halve 19. The lower distal end 31 of the locking pin 29 is adapted to interfere one of the bores 17 of the mounting ring 12 of the bulkhead fitting 2. A central section 33 of the locking pin 29 extends through a helix compression spring 34 being arranged within the chamber 30 of the first clam shell halve 19. The spring 34 is held in preloaded manner between an annular projection 35 of the locking pin 29 being closely arranged by the lower distal end 31 and a wall element 36 of the first clam shell halve 19 limiting the upper end of the chamber 30. Thereby, the locking pin 29 is biased in a direction towards the bulkhead fitting 2.

The locking mechanism 28, further, comprises a lock indicator element 37 being disposed at an upper distal end 38 of the locking pin 29 facing away from the bulkhead fitting 2. The outer diameter of the upper distal end 38 of the locking pin 29 is smaller than the outer diameter of the central section 33 of the locking pin 29. Thus, a shoulder 39 is formed between the central section 33 and the upper distal end 38 of the locking pin 29. The upper distal end 38 of the locking pin 29 extends through an upper aperture 40 of the first clam shell halve 19 being coaxially arranged with the lower aperture 32. The inner diameter of the upper aperture 40 is smaller than the outer diameter of the central section 33 of the locking pin 29.

To captively dispose the lock indicator element 37, the upper distal end 38 of the locking pin 29 is arranged outside the chamber 30 of the first clam shell halve 19 and extends through a bore 41 of the lock indicator element 37. Thus, the locking pin 29 is captively held within the chamber 30 of the first clam shell halve 19. The lock indicator element 37 may be designed as a one-piece L-shaped handle allowing manual lifting of the locking pin 29 against the biasing force out of the bore 17 of the mounting ring 12 to unlock the twist-to-connect joint 10 assuming it is in said connected position. The L-shaped handle 37 may be swaged to the upper distal end 38 of the locking pin 29. Instead of swaging, the lock indicator element 37 may also be screwed, welded or otherwise permanently connected to the locking pin 29.

The retention member 3, further, comprises a retaining device 42 being utilised to retain the two clam shell halves 19, 20 around the inner tube 1. Now referring to FIGS. 3-5, the retaining device 42 comprises a radially outward open clip housing 43 being arranged at a free end of the second clam shell halve 20 and resilient elements 44 being arranged at a free end of the first clam shell halve 19. The clip housing 43 comprises two exterior walls 45 and two interior walls 46, wherein the exterior and interior walls 45, 46 extend in circumferential direction. Thus, three grooves 47 are disposed between said walls 45, 46 being utilised to receive the resilient elements 44 of the first clam shell halve 19. The resilient elements 44 are formed as two resilient fingers 44' extending in circumferential direction and a middle finger 44" basically serving as guiding element. The two outer fingers 44' are arranged as detent fingers with beveled free ends 48. In the closed position of the retention member 3 as shown in FIG. 1, the bevelled free ends 48 are engaged behind the exterior walls 45 of the clip housing 43, thus, the resilient fingers 44' interfere the two outer grooves 47. The middle finger 44" interferes the middle groove 47" of the clip housing 43.

When the retention member 3 is arranged around the longitudinal portion 110 of the inner tube 1 and the clam shell 18 closed, the inner tube 1 is supported radially by the retention member 3. Besides that, the inner tube 1 is retained axially slidably within the bulkhead fitting 2. As the outer tube 4 covers the outside diameter of the tube collar 101 and the outside diameter of the tube collar 101 is larger than the inner diameter of the retention member 3, the inner tube 1 is be retained within the outer tube 4. As the inner tube 1 is withdrawn from the outer tube assembly, assuming the twist-to-connect joint 10 is in said connected position, the tube collar 101 hits against the annular collar 23 of the retention member 3 thus retaining the inner tube 1 within the outer tube assembly 2. By this means, some axial movement of the retained inner tube 1 within the retention member 3 and the bulkhead fitting 2 is permitted.

For connection operation of the aircraft fluid line coupling assembly, firstly, the clam shell halves 19, 20 are attached around the inner tube 1. In the closed position of the clam shell 18 as shown in FIGS. 1, 4, 5 and 7, the resilient elements 44 of the first clam shell halve 19 interfere the grooves 47 of the clip housing 43 of the second clam shell halve 20. The beveled free ends 48 of the resilient fingers 44' are engaged behind the exterior walls 45 of the clip housing 43. In said closed position, the inner tube 1 is retained axially moveable within the retention member 3, as shown in FIG. 1.

Then, to couple the inner and the outer tubes 1, 4 together, tube collar 101 of the inner tube assembly 111 and the retention member 3 are pushed together into the bulkhead fitting 2. Subsequently, the locking pin 29 disposed at the retention member 3 contacts the front face 15 of the mounting ring 12 and, further, is pressed into the chamber 30 of the first clam shell halve 19 against the spring force. By pushing the locking pin 29 inside the chamber 30, the upper distal end 38 of the locking pin 29 further comes out of the upper aperture 40, thereby lifting the L-shaped indicator handle 37.

Further, the radial protrusion 26 of the second connector element 11 is set into the insertion areas 14 of the mounting ring 12 by pushing the retention member 3 into the bulkhead fitting 2. After that, the retention member 3 is rotated clockwise. Thereby, the protrusions 26 are transferred into the catch areas 16 of the mounting ring 12. However, the stop elements 27 ensure that the retention member 3 can only be rotated clockwise to close the twist-to-connect joint 10 and further limit the rotational movement to 30°.

As long as the retention member 3 is not fully rotated 30° clockwise, the locking indicator element 37 projects, that means is not flush with an outside area 49 of the first clam shell halve 19. After having rotated the retention member 3 fully 30° clockwise, the locking pin 29 overlaps one of the bores 17 and the spring biased locking pin 29 automatically engages into the bore 17. Thereby, the operator of the coupling assembly, for instance an aircraft mechanic, perceives an audible signal such as a clicking sound caused by the shoot out of the locking pin 29 into the bore 17. Moreover, the locking indicator element 37 closes flush with the outside area 49 of the first clam shell halve 19, as shown in FIG. 7. Thus, the operator recognizes that the twist-to-connect joint 10 is in its connected position. Moreover, said connected position of the twist-to-connect joint 10 is safely locked against uncommanded or commanded disconnection by means of the locking mechanism 28.

To unlock the connected twist-to-connect joint 10, the operator manually lifts the locking indicator element 37 against the spring force, thereby lifting the locking pin 29 out of the bore 17. Then, the twist-to-connect joint 10 is unlocked and the retention member 3 can be twisted 30° counter clockwise till the protrusions 26 of the second connector element 11 reaches the insertion areas 14 of the first connector element 9. Subsequently, the retention member 3 is released and can be pulled away from the bulkhead fitting 2.

Afterwards, the two clam shell halves 19, 20 can be opened and detached from the inner tube 1 allowing the complete removal of the inner tube 1 from the bulkhead fitting 2.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 inner tube
2 outer tube assembly
3 retention member
4 outer tube
5 mounting flange
6 first front end
7 hole
8 second front end
9 first connector element
10 twist-to-connect joint
11 second connector element
12 mounting ring
13 recess
14 insertion area
15 front face
16 catch area
17 bore
18 clam shell
19 first clam shell halve
20 second clam shell halve
21 first collar halve
22 second collar halve
23 collar
24 central bore
25 inner wall section
26 protrusion
27 stop element
28 locking mechanism
29 locking element
30 chamber
31 lower distal end
32 lower aperture
33 central section
34 spring
35 projection
36 wall element
37 lock indicator element
38 upper distal end
39 shoulder
40 upper aperture
41 bore
42 retaining device
43 clip housing
44 resilient elements
45 exterior wall
46 interior wall
47 groove
48 bevelled free end 49 outside area
101 tube collar
102 groove
103 seal
104 inner land bearing
105 middle land bearing
106 outer land bearing
110 longitudinal portion
111 inner tube assembly
L longitudinal axis
X pivot axis

The invention claimed is:

1. An aircraft fluid line coupling assembly, comprising:
an inner tube;
an outer tube assembly having an outer tube, the inner tube extending into the outer tube, and having a first connector element of a twist-to-connect joint disposed on a front end of the outer tube;
a retention member having a second connector element of the twist-to-connect joint, the first and the second connector elements being detachably mated to releasably interconnect the retention member and the outer tube with each other, the retention member being arranged outwardly around a longitudinal portion the inner tube so as to prevent detachment of the inner tube from the outer tube when the twist-to-connect joint is in a connected position, and so as to allow detachment of the inner tube from the outer tube when the twist-to-connect joint is in an unconnected position; and
a locking mechanism configured to lock the twist-to-connect joint when it is in the connected position,
wherein the retention member comprises first and second clam shell halves, the clam shell halves being pivotally connected with each other about a pivot axis that is arranged parallel to a longitudinal axis of the inner tube,
wherein the retention member further comprises a retaining device configured to releasably retain the clam shell halves around the inner tube,
wherein the retaining device comprises grooves arranged at one of the clam shell halves and resilient elements arranged at another one of the clam shell halves, and
wherein the resilient elements engage into the grooves.

2. The aircraft fluid line coupling assembly according to claim 1, wherein the first connector element of the twist-to-connect joint comprises a female connector and the second connector element of the twist-to-connect joint comprises a male connector.

3. The aircraft fluid line coupling assembly according to claim 1, wherein the first connector element comprises a mounting ring disposed on the front end of the outer tube facing towards the inner tube and the second connector element comprises an annular collar disposed on the retention member and extending through a central bore of the mounting ring, the mounting ring having at least one L-shaped recess and the second connector element having at least one protrusion interfering the L-shaped recess of the mounting ring.

4. The aircraft fluid line coupling assembly according to claim 1, wherein the locking mechanism comprises an axially moveable locking element disposed at the retention member and at least one bore disposed in the outer tube assembly and arranged to receive the locking element.

5. The aircraft fluid line coupling assembly according to claim 4, wherein the locking element is biased in a direction towards the outer tube.

6. The aircraft fluid line coupling assembly according to claim 5, wherein the locking element comprises a locking pin extending through a helix compression spring, the spring being held in preloaded manner between a wall element of the retention member and an annular projection of the locking pin.

7. The aircraft fluid line coupling assembly according to claim 4, wherein the locking mechanism further comprises a lock indicator element disposed at a distal end of the locking element facing away from the outer tube.

8. The aircraft fluid line coupling assembly according to claim 7, wherein the distal end of the locking element extends through an aperture of the retention member, the lock indicator element being captively disposed at the distal end of the locking element.

9. The aircraft fluid line coupling assembly according to claim 7, wherein the lock indicator element comprises a handle configured to manually lift the locking element out of the bore to unlock the twist-to-connect joint when it is in the connected position.

10. The aircraft fluid line coupling assembly according to claim 1, wherein the inner tube is supported radially by the retention member and/or is retained axially slidable by the retention member.

11. The aircraft fluid line coupling assembly according to claim 1, wherein the retention member has an inner surface contacting an outer surface of the longitudinal portion of the inner tube.

12. The aircraft fluid line coupling assembly according to claim 1, further comprising a tube collar attached to an end of the inner tube,
wherein the outer tube covers an outside diameter of the tube collar, and
wherein the outside diameter of the tube collar is larger than an inner diameter of the retention member so as to retain the inner tube within the outer tube.

13. The aircraft fluid line coupling assembly according to claim 12, wherein the tube collar has at least one circumferential groove formed therein, and
wherein a seal is disposed in the groove in the tube collar and contacts an inner surface of the outer tube.

14. An aircraft fluid line coupling assembly, comprising:
an inner tube;
an outer tube assembly having an outer tube, the inner tube extending into the outer tube, and having a first connector element of a twist-to-connect joint disposed on a front end of the outer tube;
a retention member having a second connector element of the twist-to-connect joint, the first and the second connector elements being detachably mated to releasably interconnect the retention member and the outer tube with each other, the retention member being arranged outwardly around a longitudinal portion the inner tube so as to prevent detachment of the inner tube from the outer tube when the twist-to-connect joint is in a connected position, and so as to allow detachment of the inner tube from the outer tube when the twist-to-connect joint is in an unconnected position; and
a locking mechanism configured to lock the twist-to-connect joint when it is in the connected position,
wherein the retention member comprises first and second clam shell halves, the clam shell halves being pivotally connected with each other about a pivot axis that is arranged parallel to a longitudinal axis of the inner tube,
wherein the locking mechanism comprises an axially moveable locking element disposed at the retention member and at least one bore disposed in the outer tube assembly and arranged to receive the locking element, and wherein the locking element is biased in a direction towards the outer tube.

15. The aircraft fluid line coupling assembly according to claim 14, wherein the locking element comprises a locking pin extending through a helix compression spring, the spring being held in preloaded manner between a wall element of the retention member and an annular projection of the locking pin.

16. An aircraft fluid line coupling assembly, comprising:
an inner tube;
an outer tube assembly having an outer tube, the inner tube extending into the outer tube, and having a first connector element of a twist-to-connect joint disposed on a front end of the outer tube;
a retention member having a second connector element of the twist-to-connect joint, the first and the second connector elements being detachably mated to releasably interconnect the retention member and the outer tube with each other, the retention member being arranged outwardly around a longitudinal portion the inner tube so as to prevent detachment of the inner tube from the outer tube when the twist-to-connect joint is in a connected position, and so as to allow detachment of the inner tube from the outer tube when the twist-to-connect joint is in an unconnected position; and
a locking mechanism configured to lock the twist-to-connect joint when it is in the connected position, wherein the retention member comprises first and second clam shell halves, the clam shell halves being pivotally connected with each other about a pivot axis that is arranged parallel to a longitudinal axis of the inner tube, wherein the locking mechanism comprises an axially moveable locking element disposed at the retention member and at least one bore disposed in the outer tube assembly and arranged to receive the locking element, and wherein the locking mechanism further comprises a lock indicator element disposed at a distal end of the locking element facing away from the outer tube.

17. The aircraft fluid line coupling assembly according to claim 16, wherein the distal end of the locking element extends through an aperture of the retention member, the lock indicator element being captively disposed at the distal end of the locking element.

18. The aircraft fluid line coupling assembly according to claim 16, wherein the lock indicator element comprises a handle configured to manually lift the locking element out of the bore to unlock the twist-to-connect joint when it is in the connected position.

* * * * *